Figure 1:
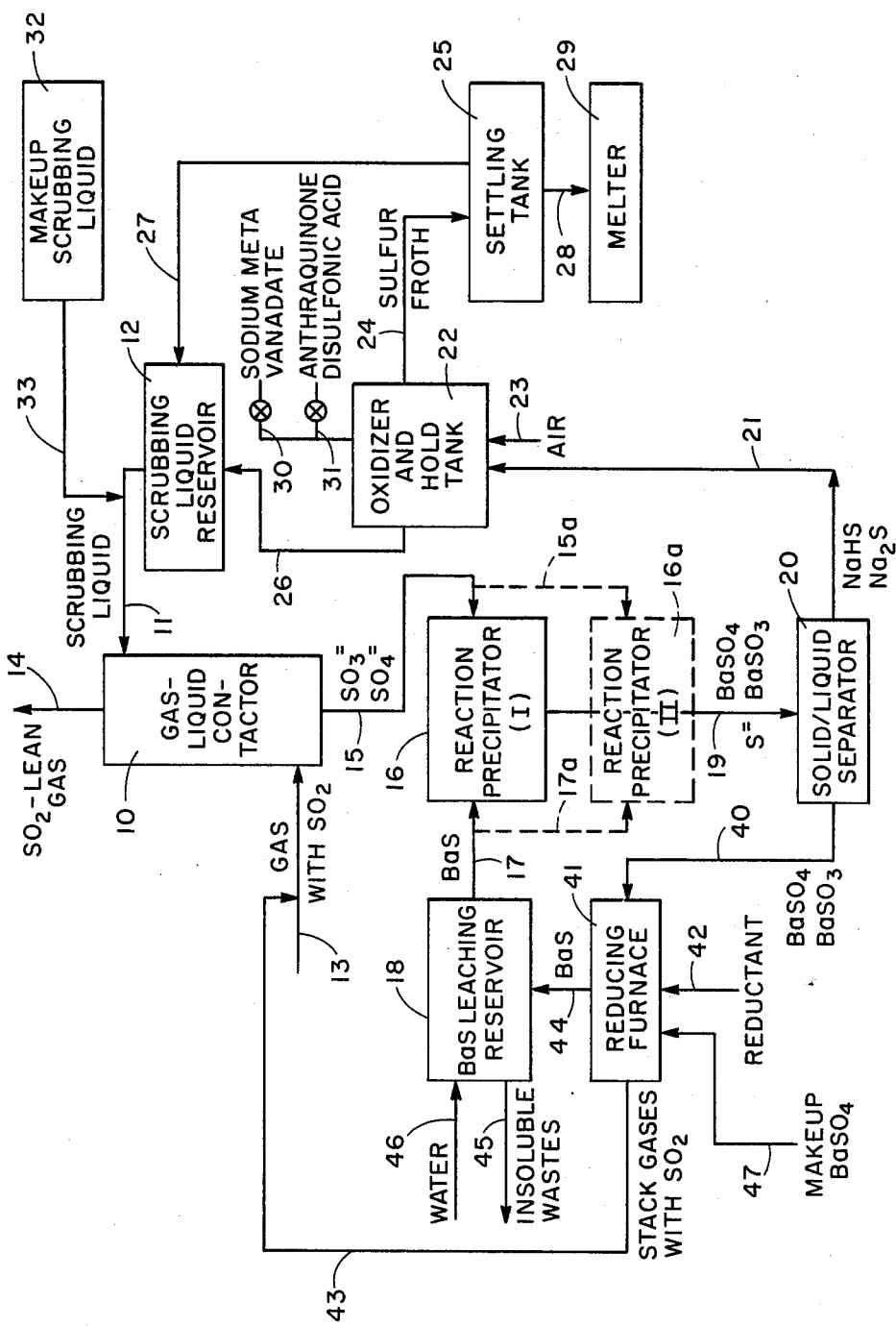

United States Patent [19]

Nadkarni

[11] 4,078,048

[45] Mar. 7, 1978

[54] PROCESS AND APPARATUS FOR REMOVING SULFUR FROM STACK GASES IN THE FORM OF ELEMENTAL SULFUR

[75] Inventor: Ravindra M. Nadkarni, Arlington, Mass.

[73] Assignee: Combustion Equipment Associates, Inc., New York, N.Y.

[21] Appl. No.: 769,169

[22] Filed: Feb. 16, 1977

[51] Int. Cl.$^2$ ............................................. C01B 17/04
[52] U.S. Cl. .............................. 423/571; 423/567 A; 23/262; 23/283
[58] Field of Search .................. 423/242, 567 A, 571, 423/561, 563; 23/262, 283

[56] References Cited

U.S. PATENT DOCUMENTS

| 1,732,905 | 10/1929 | Morgen et al. ................... 423/571 X |
| 3,752,875 | 8/1973 | O'Hern et al. ......................... 423/242 |
| 3,935,100 | 1/1976 | Alagy et al. ...................... 423/563 X |

FOREIGN PATENT DOCUMENTS

| 2,198,774 | 4/1974 | France. |
| 913,889 | 6/1954 | Germany. |
| 46,255 | 7/1970 | Japan. |
| 210,434 | 4/1925 | United Kingdom. |

OTHER PUBLICATIONS

"Acta Chimica" Academy of Science of Hungary, Budapest, 1953; pp. 130-138.

*Primary Examiner*—G. O. Peters
*Attorney, Agent, or Firm*—Bessie A. Lepper

[57] ABSTRACT

Process and apparatus for removing sulfur dioxide from gases such as stack gases. The gases are scrubbed with an alkali metal compound in an aqueous solution to form alkali metal sulfite/sulfate salts which are then reacted with barium sulfide to precipitate barium sulfite/sulfate and form alkali metal sulfide/bisulfide in solution. The alkali metal sulfide/bisulfide is oxidized to form elemental sulfur and regenerated wash liquid; and the barium sulfite/sulfate is reduced by roasting to form the barium sulfide required. In a preferable embodiment, coal is used as both the reductant and fuel in the roasting of the barium sulfite/sulfate and the stack gases from the roasting are scrubbed along with the primary stack gases. As an optional step a portion of the alkali metal sulfite salts may be oxidized to sulfate prior to reaction with barium sulfide.

38 Claims, 4 Drawing Figures

PROCESS AND APPARATUS FOR REMOVING SULFUR FROM STACK GASES IN THE FORM OF ELEMENTAL SULFUR

This invention relates to process and apparatus for the removal of sulfur dioxide from gases and more particularly to process and apparatus which result in the removal of sulfur dioxide in the form of elemental sulfur from stack gases.

With the more recent realization for the need for clean air, it has become necessary to maintain the sulfur dioxide content in stack gases below prescribed minimum levels. The two obvious alternative approaches to attain this goal are the use of essentially sulfur-free fuel and the processing of the stack gases to remove sulfur dioxide resulting from the use of sulfur-containing fuel. Since, however, sulfur-free fuels are generally more expensive than sulfur-containing fuels and are, moreover, not available in sufficient quantities for many large-scale uses (e.g., electric utility and industrial-scale boilers) it is necessary to provide efficient and economical means for removal of sulfur dioxide from stack gases.

Among some of the approaches being considered suitable for removal of sulfur dioxide in stack gases from utility- and industrial-scale boilers are (1) once-through scrubbing with a solution of sodium carbonate or sodium hydroxide; (2) lime or limestone slurry scrubbing; and (3) scrubbing with a solution of an alkali metal compound, e.g., a sodium compound (commonly called sodium scrubbing) with lime regeneration. (See "Chemical Engineering Progress Technical Manual, Sulfur and $SO_2$ Developments" A.I. Ch. E. pp 142–150 (1971).)

Once-through sodium scrubbing represents, at least for some situations, the simplest and most reliable process; but its application is limited to locations where the dissolved solids load, when combined with the remainder of the plant liquid effluent, can be treated to be acceptable as a liquid waste stream. Direct lime or limestone slurry scrubbing produces a low-solubility solid waste and is applicable at a wider range of locations than once-through sodium scrubbing. Although the cost of scrubbing chemicals is relatively low, capital cost requirements are high because a slurry of solid calcium salts must be recirculated at high rates, and the attainment of reliability is still in doubt because of the possibility of the uncontrolled deposition of a solid scale in various parts of the system.

Sulfur dioxide removal based upon sodium scrubbing with lime and/or limestone and regeneration of sodium values incorporates the better features of the once-through scrubbing and lime slurry scrubbing processes and offers additional advantages over both of them. Thus, it may be shown that sodium scrubbing with lime regeneration can use less expensive raw chemicals, produce a solid waste, can be designed for higher removal efficiency, can minimize or even eliminate scaling problems, and can lower investment costs and operating and maintenance problems. A number of such "dual-alkali" processes are known in the art. (See for example U.S. Pat. Nos. 3,775,532, 3,873,532 and 3,944,649.) The dual-alkali processes are efficient in the removal of sulfur dioxide from stack gases and the solid waste produced is generally in the form of calcium sulfite/sulfate, an inert material which can be introduced into streams or dumped into areas reserved for it. Even though this waste calcium sulfite/sulfate is regarded as inert and nonpolluting, it can present serious waste disposal problems in some areas, it requires the providing of large quantities of lime or limestone and it results in the loss of the value of the sulfur removed from the stack gases.

It would therefore be desirable to have a process and apparatus for removing sulfur dioxide from stack gases which eliminated the build-up of solid wastes requiring disposal procedures and which was economically attractive.

It is therefore a primary object of this invention to provide an improved process for the removal of sulfur dioxide from stack gases, the sulfur removed being in the form of elemental sulfur. It is another object to provide a process of the character described which eliminates the need continuously to dispose of a waste byproduct such as calcium sulfate and which produces instead a valuable, saleable commodity in the form of elemental sulfur. It is yet a further object of this invention to provide a process which can use coal, including high-sulfur coal, as the only source of thermal energy required. Still another object is the providing of a process of the character described which produces a recycle scrubbing liquid of a nature which does not cause scale build-up in the equipment.

Another primary object of this invention is to provide apparatus for removing sulfur dioxide from stack gases in the form of elemental sulfur, thus eliminating the formation and disposal of a solid waste material. Another object is the providing of apparatus of the character described which can use coal as the sole thermal energy source.

Other objects of the invention will in part be obvious and will in part be apparent hereinafter.

According to one aspect of this invention, there is provided a process for the removing of sulfur dioxide from gases in the form of elemental sulfur, comprising the steps of contacting the gases with a scrubbing liquid comprising an aqueous solution of an alkali metal compound to form an aqueous spent scrubbing liquid containing alkali metal sulfite/sulfate salts in solution; reacting the alkali metal sulfite/sulfate salts in solution with an aqueous solution of barium sulfide to precipitate insoluble barium salts and form alkali metal sulfide/bisulfide in solution; removing the insoluble barium salts from the solution of alkali metal sulfide/bisulfide; oxidizing the alkali metal sulfide/bisulfide solution to precipitate elemental sulfur and to regenerate the alkali metal compound in solution for recycling as the scrubbing liquid; separating the elemental sulfur from the solution of alkali metal compound; and reducing the insoluble barium salts formed to barium sulfide for leaching in water to use in the reaction with the alkali metal sulfide/sulfate salts.

As one optional step in this process, the alkali metal sulfite may be oxidized to convert at least a portion of the sulfite to sulfate whereby the insoluble barium salts contain a greater proportion of barium sulfate. The oxidizing step may be carried out simultaneously with the contacting step or subsequent to it. As another optional step, the solution of sulfite/sulfate salts in the spent scrubbing liquid may be subjected to a fly ash removal step prior to the precipitation reaction to form barium salts.

In a preferred embodiment of this invention, the reduction of the insoluble barium salts to form barium sulfide is done by roasting the insoluble barium salts with coal used as both fuel and reductant. The coal may have a high sulfur content, and the stack gases from such a roasting step, if they contain sulfur dioxide, may be added to the primary stack gases which are being treated. Thus the use of even high-sulfur coal, which is less expensive and more plentiful than other fuels (e.g., methane or fuel oil), introduces no additional pollution problems.

According to another aspect of this invention, there is provided apparatus for the removing of sulfur dioxide from gases in the form of elemental sulfur, which comprises gas-liquid contacting means arranged to contact gases containing sulfur dioxide with a scrubbing liquid comprising an aqueous solution of an alkali metal compound whereby the sulfur dioxide is reacted to form a spent scrubbing liquid containing alkali metal sulfite/sulfate salts; means to withdraw sulfur dioxide-lean gases from the gas-liquid contacting means; reaction precipitator means; transfer means to introduce the spent scrubbing liquid from the gas-liquid contacting means into the reaction precipitator means; means to introduce an aqueous solution of barium sulfide from barium sulfide reservoir means into the reaction precipitator means; means to remove the insoluble barium salts formed in the reaction precipitator means to form an aqueous solution of alkali metal sulfide and bisulfide; means to oxidize the alkali metal sulfide and bisulfide to form elemental sulfur and an aqueous solution of alkali metal compound; means to separate the elemental sulfur from the aqueous solution of alkali metal compound; means to convey the solution of alkali metal compound to the contacting means as the scrubbing liquid; means to reduce the insoluble barium salts to form barium sulfide, and means to transfer the barium sulfide into the barium sulfide reservoir means.

Optionally, the apparatus may also include means to meter a small amount of an oxidation catalyst into the scrubbing liquid and to introduce a gaseous oxidant, e.g., air, oxygen or mixtures thereof, into the contacting means to effect the oxidation of at least a portion of the alkali metal sulfite formed to sulfate; or means to oxidize at least a portion of the alkali metal sulfite in the spent wash liquid to sulfate after discharge from the contacting means. The apparatus may also include fly ash removal means located between the gas-liquid contacting means and the reaction precipitator means.

The invention accordingly comprises the several steps and the relation of one or more of such steps with respect to each of the others, and the apparatus embodying features of construction, combinations of elements and arrangement of parts which are adapted to effect such steps, all as exemplified in the following detailed diclosure, and the scope of the invention will be indicated in the claims.

Figure 2:
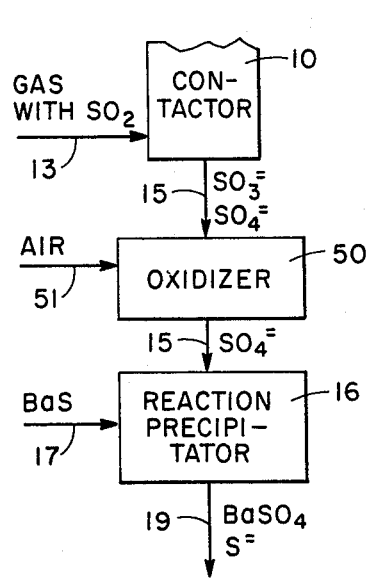
Figure 4:
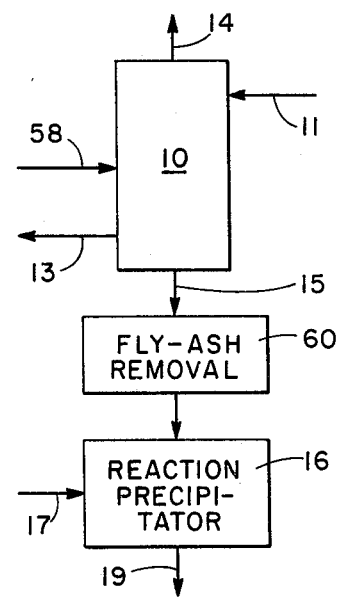
Figure 3:
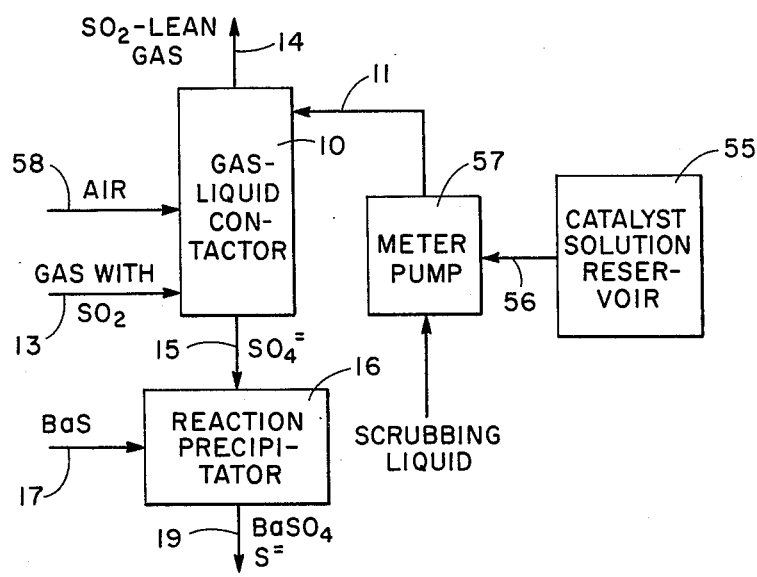

For a further understanding of the nature and objects of the invention, reference should be had to the following detailed descriptions taken in connection with the accompanying drawings in which FIG. 1 is a schematic of the apparatus of this invention presented in a manner to also provide a flow diagram of the basic process;

FIG. 2 is one modification of the process and apparatus of FIG. 1 showing the incorporation of separate means to oxidize at least a portion of the sulfite formed during scrubbing;

FIG. 3 is another modification of the process and apparatus of FIG. 1 showing the incorporation of means to meter an oxidation catalyst into the makeup scrubbing liquid and means to introduce, if necessary, a gaseous oxidant such as air, oxygen or mixtures thereof, into the contacting means; and FIG. 4 is a modification of the process and apparatus of FIG. 1 showing the incorporation of fly ash removal means.

In the following description, it will be assumed for convenience in describing the invention that one or more sodium compounds, e.g., NaOH, $Na_2CO_3$ or $Na_2SO_3$ are used in the scrubbing liquid. However, it is to be understood that the hydroxides, carbonates and sulfites of the other alkali metals (i.e., lithium, potassium, rubidium and cesium, as well as ammonium) may be used in the process of this invention. In all cases where equations are written for sodium compounds it will be apparent that they are equally applicable to the other alkali metal compounds; and where equations are written for one of the sodium compounds, e.g., NaOH, it will be apparent that the equivalent equations can be written for $Na_2CO_3$ or $Na_2SO_3$.

The process of this invention may be further described in detail with reference to the drawings which are somewhat schematic with regard to the apparatus components and simplified with respect to process flow diagrams. As will be seen in FIG. 1, the stack gases from which sulfur dioxide is to be removed are introduced into a gas-liquid contactor 10 which is a mass transfer apparatus suitable for effecting efficient gas-liquid contact to react the required amount of the $SO_2$ with one or more alkali metal compounds in aqueous solution serving as the scrubbing liquid. This scrubbing liquid is brought into contactor 10 through line 11 from a scrubbing liquid reservoir 12. In the following detailed descriptions, auxiliary equipment such as pumps, valves and the like are not specifically illustrated since their use and placement will be apparent to those skilled in the art. The contactor 10 may by any suitable commercially available apparatus such as a countercurrent or cocurrent gas-scrubbing device or combination of such devices. In the drawing a countercurrent scrubber is shown in which the $SO_2$-containing stack gas is introduced near the bottom through line 13 and the $SO_2$-lean gas is discharged near the top through line 14. It will be appreciated that it will normally not be feasible to remove all of the $SO_2$ from the stack gases and that the actual amount of $SO_2$ to be removed will be preset for any one given set of circumstances and that the operational parameters of the $So_2$-removal process will then be determined to meet the requirements of the system designed for the circumstances.

Within scrubber 10 the absorption of $SO_2$ gives rise to the formation of alkali metal bisulfite, alkali metal sulfite and alkali metal sulfate according to the following overall reactions, using sodium hydroxide containing some sodium sulfite as the alkali metal compounds dissolved in the scrubbing liquid:

$$2NaOH + SO_2 \rightarrow Na_2SO_3 + H_2O \tag{1}$$

$$Na_2SO_3 + SO_2 + H_2O \rightarrow 2NaHSO_3 \tag{2}$$

$$2Na_2SO_3 + O_2 \rightarrow 2Na_2SO_4 \tag{3}$$

$$2NaHSO_3 + O_2 \rightarrow 2NaHSO_4. \tag{4}$$

In accordance with known scrubbing practice, the concentrations of the alkali metal compounds in the scrubbing liquid may vary. As an example, the scrubbing liquid may contain about 0.1 M sulfite ions or 0.1 M hydroxyl ions. In addition, after the system has reached its stable operating conditions, the scrubbing liquid may contain up to about 0.3 M sulfate ions, a concentration which remains essentially constant as the scrubbing liquid is continuously circulated. The optimum choice of reactant concentration in the scrubbing liquid is well within the skill of the practicing chemist and these exemplary figures are not to be taken as limiting. The pH of the scrubbing liquid will vary with the alkali metal compound or compounds used. It may range from moderately alkaline (e.g., a pH of 10 when using a carbonate or sulfite) to strongly alkaline (e.g., a pH of 13-14) when using an hydroxide.

The amount of scrubbing liquid used will be that which is required to remove the required proportion of the sulfur dioxide present in the stack gases. Given the concentration of the sulfur dioxide in the gases, the rate of feed, and the concentration of the alkali metal compound in the scrubbing liquid, the amount of scrubbing liquid is readily determined. In a preferable embodiment of this invention, the amount of the reactant (alkali metal compound) in the scrubbing liquid is essentially that which is the stoichiometric quantity required to react with all of the sulfur dioxide to be removed. Thus by providing a predetermined quantity of scrubbing compound, a predetermined amount of sulfur dioxide is removed.

The scrubbing liquid is conveniently introduced into the gas-liquid contactor under ambient conditions of pressure and temperature. Since the gases from which the sulfur dioxide is to be removed are normally conducted directly from the conbustion equipment in which they are generated to the gas-liquid cntactor, scrubbing will take place at an elevated temperature which means that the spent scrubbing liquid containing the alkali metal sulfite/sulfate salts leaves the gas-liquid contactor at an elevated temperature, e.g., between about 50° and 60° C. This spent scrubbing liquid will generally have a pH in the range of neutral to slighty acid, e.g., a pH of about 6.

In the following description, as well as in the drawings and in the claims, the products of reaction between the sulfur dioxide in the stack gases and the alkali metal compounds in the scrubbing liquid will be referred to as the sulfites and sulfates or as the sulfite/sulfate salts. In all such cases, unless otherwise specified, it is to be understood that such terms also include any bisulfites and bisulfates which may also be present.

The solution which makes up the spent scrubbing liquid effluent and contains sulfite/sulfate salts is withdrawn from the gas-liquid contactor and introduced through line 15 into a reaction precipitator 16 for reaction with an aqueous solution of barium sulfide conducted through line 17 from a barium sulfide leach reservoir 18.

Alternatively, as shown in FIG. 4, the spent scrubbing solution containing the sulfite/sulfate salts may be directed first through fly ash removal means 60, located in line 15, prior to its introduction into reaction precipitator 16. If fly ash is present in the spent scrubbing liquid it is desirable to prevent its circulation through the system.

The concentration of the barium sulfide solution should be that which is less than saturation concentration at the temperature at which it is reacted with the sulfite/sulfate salts in reaction precipitator 16. If, for example, the spent scrubbing liquid containing the sulfite/sulfate salts enters the reaction precipitator at between about 50° and 60° C, the solids concentration of the barium sulfide solution should be somewhat less than 20% by weight, e.g., about 15%.

The reactions which take place in reaction precipitator 16 may be written as follows:

$$Na_2SO_3 + BaS \rightarrow Na_2S + BaSO_3 \downarrow \qquad (5)$$

$$Na_2SO_4 + BaS \rightarrow Na_2S + BaSO_4 \downarrow \qquad (6)$$

$$NaHSO_3 + BaS \rightarrow NaHS + BaSO_3 \downarrow \qquad (7)$$

$$NaHSO_4 + BaS \rightarrow NaHS + BaSO_4 \downarrow \qquad (8)$$

These reactions (5)-(8) are carried out at atmospheric pressure and at an elevated temperature dictated by the temperatures of the spent scrubbing liquid discharged from the gas-liquid contactor and of the barium sulfide solution drawn from leach reservoir 17. The amount of BaS introduced into reaction precipitator 16 is so adjusted to provide no more barium sulfide than is stoichiometrically required to react with the sulfite/sulfate salts. It is, in fact, preferable to provide slightly less than the stoichiometrically required barium sulfide to prevent any buildup of barium ions in the recycled scrubbing liquid.

The ratio of barium sulfite to barium sulfate in the mixed salts formed in reaction precipitator 16 is, of course, dependent upon the ratio of sodium sulfite to sodium sulfate in the spent scrubbing liquid effluent delivered to reaction chamber 16. Since barium sulfite in the conditions provided precipitates out as well as barium sulfate, a high ratio of alkali metal sulfite to alkali metal sulfate may be tolerated in the feed into reaction chamber 16.

Reaction precipitator 16 may be any commercially available equipment suitable for mixing and reacting two confluent liquid streams and for handling the resultant slurry of precipitated solid barium salts in an aqueous solution of alkali metal sulfide/bisulfide. In some cases, it may be desirable to carry out this reaction between spent scrubbing liquid and barium sulfide solution in stages, a indicated by the dotted lines in FIG. 1. Reaction precipitator 16a (Stage II) may receive all reactants from reaction precipitator 16; or additional BaS and/or spent scrubbing liquid may be introduced therein through lines 17a and 17b. Suitable staged reactors are known and available.

The reaction products are taken from reaction precipitator 16 through a suitable conduit means 19 to solid-/liquid separator means 20 such as any suitable thickener-filter apparatus capable of isolating the solid barium salts. The disposition and handling of the solid barium salts will be described below.

The sodium sulfide/bisulfide solution results from the removal of the barium salts is then taken through line 21 to an oxidizer 22 where the sulfide and bisulfide are oxidized by air in the presence of a suitable catalyst to form elemental sulfur and to regenerate the sodium compound constituting the active reactant in the scrubbing liquid. The oxidation reactions which take place may be represented as $$2Na_2S + O_2 + 2H_2O \rightarrow 4NaOH + 2S° \downarrow \qquad (9)$$

$$4NaHS + 2O_2 \rightarrow 4NaOH + 4S° \downarrow \qquad (10)$$

This step of oxidizing the sodium sulfide/bisulfide to elemental sulfur may be carried out by using one of several different redox systems such as employed in the Stretford or Takahax processes for removing hydrogen sulfide from gas streams. The stretford process uses air as the oxidant and a mixture of sodium metavanadate serving as a source of water-soluble polyvalent metal ions and anthraquinone disulfonic acid as the catalyst (see for example *The Chemical Engineer*, February, 1974, pp 84–90); while the Takahex process uses naphthaquinone as the catalyst.

In the process and apparatus shown in FIG. 1, the oxidation of the soidum sulfide/bisulfide solution is illustrated using sodium metavanadate and anthraquinone disulfonic acid. The aqueous solution of sodium sulfide/bisulfide from solid/liquid separator 20 is carried through line 21 to an oxidizer and hold tank 22. A gaseous oxidant is introduced under pressure through line 23 into tank 22 to aerate and mix with the liquid and oxidize the sulfides to elemental sulfur according to reaction (9) and (10). The elemental sulfur formed is finely divided and it is floated to the top of tank 22 by the air. By holding the reaction mixture in tank 22 for several minutes (e.g., about 10 minutes) the completion of the reactions between S$^{--}$ and HS$^-$ and vanadium is assured $$2Na_2S + 2V^{+5} + O_2 + 2H_2O \rightarrow 4NaOH + 2V^{+4} + 2S° \downarrow \qquad (11)$$

$$4NaHS + 4V^{+5} + 2O_2 \rightarrow 4NaOH + 4V^{+4} + 4S° \downarrow \qquad (12)$$

The sulfur formed is finely divided and contained in a froth having from about 6% to 8% by weight sulfur. This froth overflows through line 24 from the oxidizer and hold tank 22 into a settling tank 25 where s sulfur slurry is accumulated for subsequent recovery. The liquid in tank 22 from which the sulfur has been extracted is pumped through line 26 into the scrubbing liquid reservoir 12 for recycling. The top liquid from settling tank 25 is transferred through line 27 to scrubbing liquid reservoir 12 and the concentrated sulfur slurry is accumulated and subsequently transferred by way of line 28 to melter 29 which may be an autoclave. The resulting sulfur thus produced is of sufficient purity to be marketed for commercial purposes.

In beginning the process, the sodium metavanadate and anthraquinone disulfonic acid are introduced into the oxidizer and hold tank 22 through lines 30 and 31. Thereafter, since these catalysts, in the embodiment illustrated in FIG. 1, remain in the circulating liquid, it is only necessary to introduce any required makeup catalytic material. Generally it is preferable to use the stoichiometrically required amount of vanadate ions or a slight excess thereof.

In the system illustrated in FIG. 1, the role of the anthraquinone disulfonic acid (ADA) is that of an oxidizer of the V$^{+4}$ vanadate according to the reaction $$V^{+4} + ADA \rightarrow V^{+5} + \text{reduced ADA} \qquad (13)$$

The reduced ADA is, in turn, reoxidized by the air according to the equation $$\text{Reduced ADA} + O_2 \rightarrow ADA + H_2O \text{ (oxidize)}. \qquad (14)$$

It will, of course, be recognized that the use of sodium metavanadate and anthraquinone disulfonic acid as catalysts in the oxidation of the sulfide and bisulfide to elemental sulfur is but one exemplary way in which this oxidizing step may be performed. Other systems which achieve this oxidation step may be used in the process of this invention.

Since a small amount of the scrubbing liquid is lost in recycling it, the required makeup scrubbing liquid is provided from reservoir 32 by way of line 33 into the scrubbing liquid inlet line 11.

Returning now to the solid barium salts isolated in solid/liquid separator 20, it will be seen from FIG. 1 that they are carried through line 40 into a reducing furnace 41. Reducing furnace 41 may be, for example, a batch furnace or a continuous rotary furnace. The reducing furnace 41 may be fired with natural gas, fuel oil or powdered coal through a fuel line 42 which may be separate from or a branch of feed line 40. The charge of barium sulfate/sulfite, mixed with powdered coal or coke as the reductant and any makeup barium sulfate brought in through line 47, is heated to between about 1150° and 1200° C at which point the reduction is essentially complete and the resulting barium sulfide is conveyed by line 44 to a barium sulfide leach reservoir into which water through line 46 is added to form the barium sulfide of the required concentration. Insoluble wastes are filtered off and discharged by way of line 45. As an alternative to introducing makeup barium sulfate into the roasting furnace, makeup barium sulfite may be introduced into barium sulfide leach reservoir 18.

Although, as noted above, thermal energy sources such as natural gas and fuel oil may be used, it is preferable to use powdered coal as both fuel and reductant is forming the barium sulfide as shown in the following reactions:

$$BaSO_4 + 2C \rightarrow BaS + 2CO_2 \qquad (15)$$

$$BaSO_3 + 2C \rightarrow BaS + CO_2 + CO. \qquad (16)$$

By roasting the barium sulfate/barium sulfite mixture using only powdered coal there is provided a highly efficient, economical way of regenerating the barium sulfide required.

As noted previously, high-sulfur coal may be used in regenerating the barium sulifide; and if it is used the stack gases from the reducing furnace 41 may be taken by way of line 43 into gas inlet line 13, or alternatively the gases from the roaster may be introduced directly into gas-liquid contactor 10. The added sulfur dioxide from the roaster will generally amount to about two percent of the sulfur dioxide in the primary stack gases being treated and it may therefore be easily handled in the system without any significant increase in equipment size or amount of wash liquid required. Thus in the process and apparatus of this invention, it is not only possible but preferable to use the less expensive, more plentiful high-sulfur coal without contributing to atmospheric pollution.

Under some circumstances, e.g., where particular settling and filtration chracteristics of the barium sulfite/sulfate salts formed in reaction precipitator 16 are desired, it will be desirable to increase the ratio of alkali metal sulfate to alkali metal sulfite in the spent wash liquid discharged from contactor 10. This is readily accomplished by oxidizing some or essentially all of the alkali metal sulfite to sulfate, either through the use of a catalytic system circulating in the scrubbing liquid as shown in FIG. 1, as a separate step in an oxidizer, or simultaneously with the contacting step in the gas-liquid contactor. These two latter modifications are illustrated in FIGS. 2 and 3 in which the same reference numerals are used as in FIG. 1 to identify the same apparatus components. One or the other of these modifications may be used in addition to or in place of an oxidation catalyst in the scrubbing liquid.

In the modification illustrated in FIG. 2, there is provided oxidation means 50 which may be, for example, an aerator or any other suitable device for contacting a gaseous oxidant such as air, delivered through line 51, with the spent wash liquid. The oxidizer 50 is placed in line 15 between the contactor 10 and reaction chamber 16. The use of a catalyst in this oxidation step is optional. If desired, a water-soluble salt of a metal capable of undergoing a valence change (e.g., iron, cobalt, copper, vanadium, manganese or nickel) may be added to the spent wash liquid as an oxidation catalyst to reduce the size of the aerator, or other oxidizing equipment, and hence to reduce capital costs. The extent to which the sulfite and bisulfite salts in the spent wash liquid are oxidized may readily be controlled by well-known techniques.

The spent wash liquid after oxidation is delivered through line 15 to the reaction precipitator as described in connection with FIG. 1 and the remaining steps are the same as previously described.

Alternatively, the desired amount of oxidation of the alkali metal sulfite and bisulfite may be carried out in the gas-liquid contactor simultaneously with the scrubbing of the stack gases. The process for carrying out oxidation in the gas-liquid contactor is described in detail in U.S. Pat. No. 3,920,794. The modification of the process and apparatus embodying the oxidation of the alkali metal sulfite to sulfate within the gas-liquid contactor is illustrated in FIG. 3. The catalyst is a water solution of a salt of a metal such as iron, cobalt, copper, vanadium, manganese or nickel. The catalyst solution is provided from a catalyst solution reservoir 55 by way of line 56 into a meter pump 57 which adjusts the amount of catalyst solution to scrubbing liquid to provide at least one part by weight of metal ion per million parts by weight of scrubbing liquid. The stack gases being scrubbed may contain sufficient oxygen to provide the amount required to oxidize the desired amount of sulfite to sulfate. If insufficient oxygen is present in the stack gases then air or ay other suitable gaseous oxidant may be introduced through line 58 into the gas-liquid contractor.

There are provided in this invention a completely integrated process and apparatus for removing sulfur dioxide from gases in a manner to produce a saleable byproduct — elemental sulfur — in place of a waste material which can present disposal problems. Moreover, the process and apparatus of this invention offer the very attractive capability of using coal (high- or low-sulfur) as the sole thermal energy source while at the same time creating no additional pollution control problems.

It will thus be seen that the objects set forth above, among those made apparent from the preceding description, are efficiently attained and, since certain changes may be made in carrying out the above process and in the constructions set forth without departing from the scope of the invention, it is intended that all mater contained in the above description or shown in the accompanying drawings shall be interpreted as illustrative and not in a limiting sense.

I claim:

1. A process for removing sulfur dioxide in the form of elemental sulfur from gases, comprising the steps of a. contacting gases containing sulfur dioxide with a scrubbing liquid comprising an aqueous solution of an ammonium or alkali metal compound having an alkaline pH thereby to form an aqueous spent scrubbing liquid containing ammonium or alkali metal sulfite/sulfate salts, the pH of said aqueous spent scrubbing liquid being no lower than about 6;
    b. reacting said sulfite/sulfate salts in said aqueous spent scrubbing liquid with an aqueous solution of barium sulfide, the solids concentration of which is below saturation at the temperature of said reacting step, thereby to precipitate insoluble barium salts and form ammonium or alkali metal sulfide/bisulfide in solution without the evolution of gaseous $H_2S$;
    c. removing said insoluble barium salts from said solution of said sulfide/bisulfide;
    d. oxidizing said sulfide/bisulfide solution using as an oxidation catalyst a source of water-soluble polyvalent metal ions dissolved in said solution to precipitate elemental sulfur directly from said solution and to regenerate ammonium or alkali metal compound in solution for recycling as said scrubbing liquid; and
    e. separating said elemental sulfur from said compound in solution.

2. A process in accordance with claim 1 including the step of reducing said insoluble barium salts from step (c) to form barium sulfide for dissolution in water for use in step (b).

3. A process in accordance with claim 1 wherein said alkali metal compound is a sodium, lithium, potassium, rubidium, cesium compound.

4. A process in accordance with claim 3 wherein said alkali metal compound is a sodium compound.

5. A process in accordance with claim 1 wherein said ammonium or alkali metal compound is an hydroxide, carbonate or sulfite.

6. A process in accordance with claim 1 wherein the amount of said barium sulfide used to form said insoluble barium salts is no greater than the stoichiometric quantity required to react with all of said sulfite/sulfate slts.

7. A process in accordance with claim 1 wherein said step of reacting said sulfite/sulfate salts with said barium sulfide comprises carrying out the reaction in at least two stages.

8. A process in accordance with claim 1 wherein said reducing of said insoluble barium salts comprises roasting said insoluble barium salts with a reductant.

9. A process in accordance with claim 8 wherein said reductant is coal.

10. A process in accordance with claim 1 wherein said reducing of said insoluble barium salts comprises roasting said insoluble barium salts with a reductant and a fuel at an elevated temperature.

11. A process in accordance with claim 10 wherein said reductant and said fuel are both powdered coal.

12. A process in accordance with claim 10 including the step of adding makeup barium sulfate to said reductant and fuel in said roasting step.

13. A process in accordance with claim 8 including the step of adding the product gases from said roasting step to said gases containing sulfur dioxide thereby to remove sulfur dioxide resulting from said roasting.

14. A process in accordance with claim 1 including the step of oxidizing at least a portion of the sulfite salts in said spent scrubbing liquid to sulfates prior to reacting with said barium sulfide.

15. A process in accordance with claim 14 wherein said step of oxidizing said sulfite salts comprises adding to said scrubbing liquid a solution of an oxidation catalyst for the oxidation of sulfite to sulfate.

16. A process in accordance with claim 15 wherein said oxidation catalyst is a salt of iron, cobalt, copper, vanadium, manganese or nickel.

17. A process in accordance with claim 15 including the step of introducing a gaseous oxidant into said scrubbing liquid during said contacting step.

18. A process in accordance with claim 14 wherein said step of oxidizing said sulfite salts comprises passing a gaseous oxidant through said spent scrubbing liquid subsequent to said contacting step and prior to said step of reacting with barium sulfite.

19. A process in accordance with claim 14 wherein said step of oxidizing said sulfite salts comprises circulating an oxidation catalyst with said scrubbing liquid.

20. A process in accordance with claim 1 wherein said step of oxidizing said sulfide/bisulfide solution to precipitate elemental sulfur comprises adding said oxidation catalyst to said sulfide/bisulfide solution and treating said solution with a gaseous oxidant.

21. A process in accordance with claim 20 wherein said oxidation catalyst is a redox system comprising sodium metavanadate and anthraquinone disulfonic acid or naphthaquinone.

22. A process in accordance with claim 20 wherein said elemental sulfur is in the form of a froth and wherein said process includes the steps of isolating said froth as an aqueous slurry, removing said sulfur from said slurry containing a portion of said ammonium or alkali metal compound and melting said sulfur to form a commercially acceptable sulfur.

23. A process in accordance with claim 2 including the step of returning said portion of said ammonium or alkali metal compound to said scrubbing liquid.

24. A process in accordance with claim 1 including the step of removing fly ash from said spent scrubbing liquid prior to reacting it with said solution of barium sulfide.

25. An apparatus for removing sulfur in the form of elemental sulfur from gases containing sulfur dioxide, comprising in combination
 a. gas-liquid contacting means arranged to contact gases containing sulfur dioxide with a scrubbing liquid comprising an aqueous solution of an ammonium or alkali meal compound whereby said sulfur dioxide is reacted to form a spent scrubbing liquid containing ammonium or alkali metal sulfite/sulfate salts;
 b. means to withdraw sulfur dioxide-lean gases from said gas-liquid contacting means;
 c. reaction precipitator means;
 d. transfer means to introduce said spent scrubbing liquid from said gas-liquid contacting means into said reaction precipitator means;
 e. means to introduce an aqueous solution of barium sulfide from barium sulfide reservoir means into said reaction precipitator means;
 f. means to remove the insoluble barium salts formed in said reaction precipitator means to form an aqueous solution of ammonium or alkali metal sulfide and bisulfide;
 g. means to oxidize said sulfide and bisulfide to form elemental sulfur and an aqueous solution of ammonium or alkali metal compound;
 h. means to separate sid elemental sulfur from said aqueous solution of ammonium or alkali metal compound; and
 i. means to convey said solution of ammonium or alkali metal compound to said contacting means as said scrubbing liquid.

26. Apparatus in accordance with claim 25 including means to reduce said insoluble barium salts to form barium sulfide.

27. An apparatus in accordance with claim 25 including fly ash removal means associated with said transfer means.

28. An apparatus in accordance with claim 25 wherein said reaction precipitator means comprises a staged precipitator.

29. An apparatus in accordance with claim 25 wherein said means to oxidize said sulfide and bisulfide to form said elemental sulfur comprises oxidizer and hold tank means, means to introduce a gaseous oxidant into said tank means and means to withdraw said sulfur in the form of a sulfur froth slurry from said tank means.

30. An apparatus in accordance with claim 29 including means to separate said sulfur from said slurry and means to melt said sulfur.

31. An apparatus in accordance with claim 25 including means to oxidize at least a portion of said ammonium or alkali metal sulfite in said sulfite/sulfate salts to ammonium or alkali metal sulfate.

32. An apparatus in accordance with claim 31 wherein said means to oxidize said sulfite comprises means to introduce a gaseous oxidant into said gas-liquid contacting means.

33. An apparatus in accordance with claim 32 including means to maintin a predetermined level of an oxidation catalyst in said gas-liquid contacting means.

34. An apparatus in accordance with claim 31 wherein said means to oxidize said sulfite comprises separate oxidizer means between said gas-liquid contacting means and said reaction precipitator means and means to introduce a gaseous oxidant into said separate oxidizer means.

35. An apparatus in accordance with claim 25 wherein said means to reduce said insoluble barium salts comprises roasting furnace means.

36. An apparatus in accordance with claim 35 including means to introduce powdered coal as a fuel and a reductant into said roasting furnace means.

37. An apparatus in accordance with claim 36 including means to introduce makeup barium sulfate with said powdered coal into said roasting furnace means.

38. An apparatus in accordance with claim 36 including means to convey combustion gases from said roasting furnace means into said gas-liquid contacting means.

* * * * *